US007995712B2

(12) United States Patent
VanEpps, Jr.

(10) Patent No.: US 7,995,712 B2
(45) Date of Patent: Aug. 9, 2011

(54) CALL HOLDING FOR A VIDEO CALL IN A MOBILE COMMUNICATION DEVICE

(75) Inventor: Daniel J. VanEpps, Jr., Apex, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1440 days.

(21) Appl. No.: 11/479,870

(22) Filed: Jun. 30, 2006

(65) Prior Publication Data
US 2008/0002022 A1 Jan. 3, 2008

(51) Int. Cl.
*H04M 1/64* (2006.01)
(52) U.S. Cl. ........................ 379/76; 348/14.09
(58) Field of Classification Search .................. 379/202, 379/93.21, 93.01, 204, 206, 93.17, 93.11, 379/114.13, 67.1; 348/14.01–14.16, 22; 455/566, 414.1, 414.4, 414.3, 415, 422.1, 455/446, 517, 557, 3.01, 3.04, 565
See application file for complete search history.

(56) References Cited

U.S. PATENT DOCUMENTS
5,886,734 A * 3/1999 Ozone et al. ............... 348/14.09
6,400,804 B1 * 6/2002 Bilder ....................... 379/114.13

FOREIGN PATENT DOCUMENTS
WO WO0237848 5/2002

OTHER PUBLICATIONS
PCT International Search Report, International Application No. PCT/2007/060387, Mailed: Oct. 26, 2007.

* cited by examiner

*Primary Examiner* — Curtis Kuntz
*Assistant Examiner* — Maria El-Zoobi
(74) *Attorney, Agent, or Firm* — Coats & Bennett, P.L.L.C.

(57) ABSTRACT

A mobile communication device includes video communication capability. When the video call is place on hold by the mobile communication device, a pre-recorded video is transmitted to the holding party. The pre-recorded video may be stored in the memory of the mobile communication device or may be stored in a video server in the network. In the latter case, the mobile communication device signals the video server to transmit a selected video to the holding party when the video call is placed on hold.

12 Claims, 5 Drawing Sheets

CALL HOLDING FOR A VIDEO CALL IN A MOBILE COMMUNICATION DEVICE

BACKGROUND

The present invention relates generally to video communications over wireless networks and, more particularly, to video conferencing applications for mobile communication devices.

Third generation mobile communication networks currently being introduced are designed for high speed, multimedia communications. As 3G systems are deployed, video telephony and video conferencing applications will become more common. With video telephony applications, video images may be transmitted during a call, allowing the parties to see one another. Many service providers will also provide group video conferencing services.

When a person is engaged in a video call, there may be circumstances when it is necessary to put a call on hold. For example, a user may place an ongoing video call on hold to answer an incoming call or to transfer the call. Also, an incoming call may be placed on hold until an ongoing call is ended. Currently, no video or audio is transmitted to the holding party while the video call is on hold.

SUMMARY

The present invention relates to a video telephony application for mobile communication devices, such as cellular telephones and personal digital assistants. According to one embodiment of the invention, a pre-recorded video stored in memory is transmitted to a remote party when a call with a remote party is placed on hold. The pre-recorded video may be stored in the memory of the mobile communication device or may be stored in a video server in the network. In the latter case, the mobile communication device signals the video server to transmit a selected video to the holding party when a call is placed on hold.

The video may be selected in any manner. In one embodiment, a video list is stored in memory. When a video call is placed on hold, a video is selected from the video list. The video may be selected sequentially each time a video call is placed on hold or randomly.

In one embodiment, the mobile communication device may store an address book in memory. A particular video or video list may be associated with each entry in the address book. When a call is placed on hold, the mobile communication device determines whether the holding party has a corresponding entry in the address book and, if so, selects a video to transmit. A default video or video list may be specified for persons not entered in the address book.

DETAILED DESCRIPTION

The present invention relates to mobile communication devices with video capabilities. The present invention has general application in a wide range of communication devices including without limitation cellular telephones, personal digital assistants, and laptop computers. Therefore, the following illustrative embodiments should not be considered as limiting the scope of the claimed invention.

Figure 1:
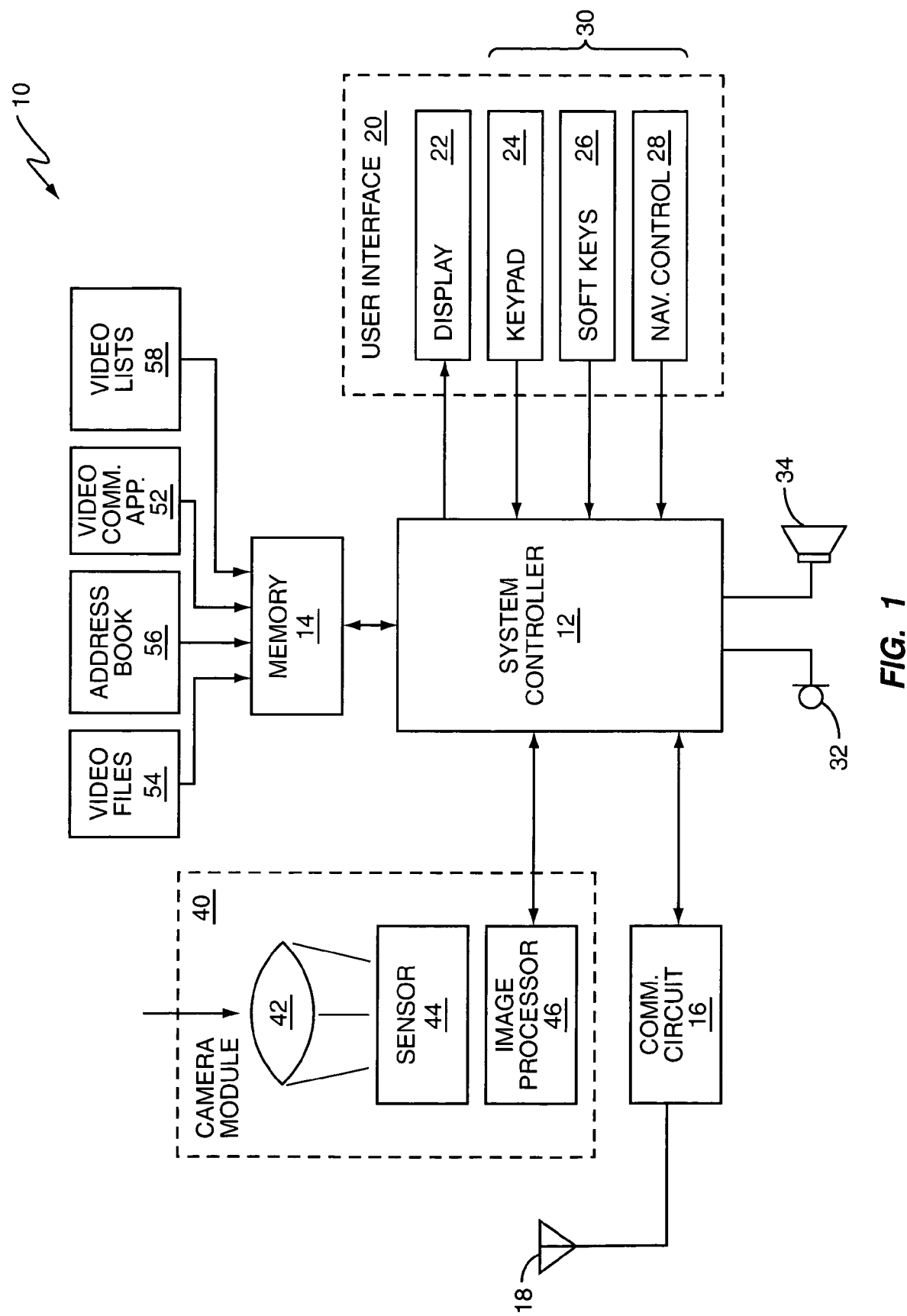
FIG. 1 is a block diagram of an exemplary mobile communication device.
Figure 2:
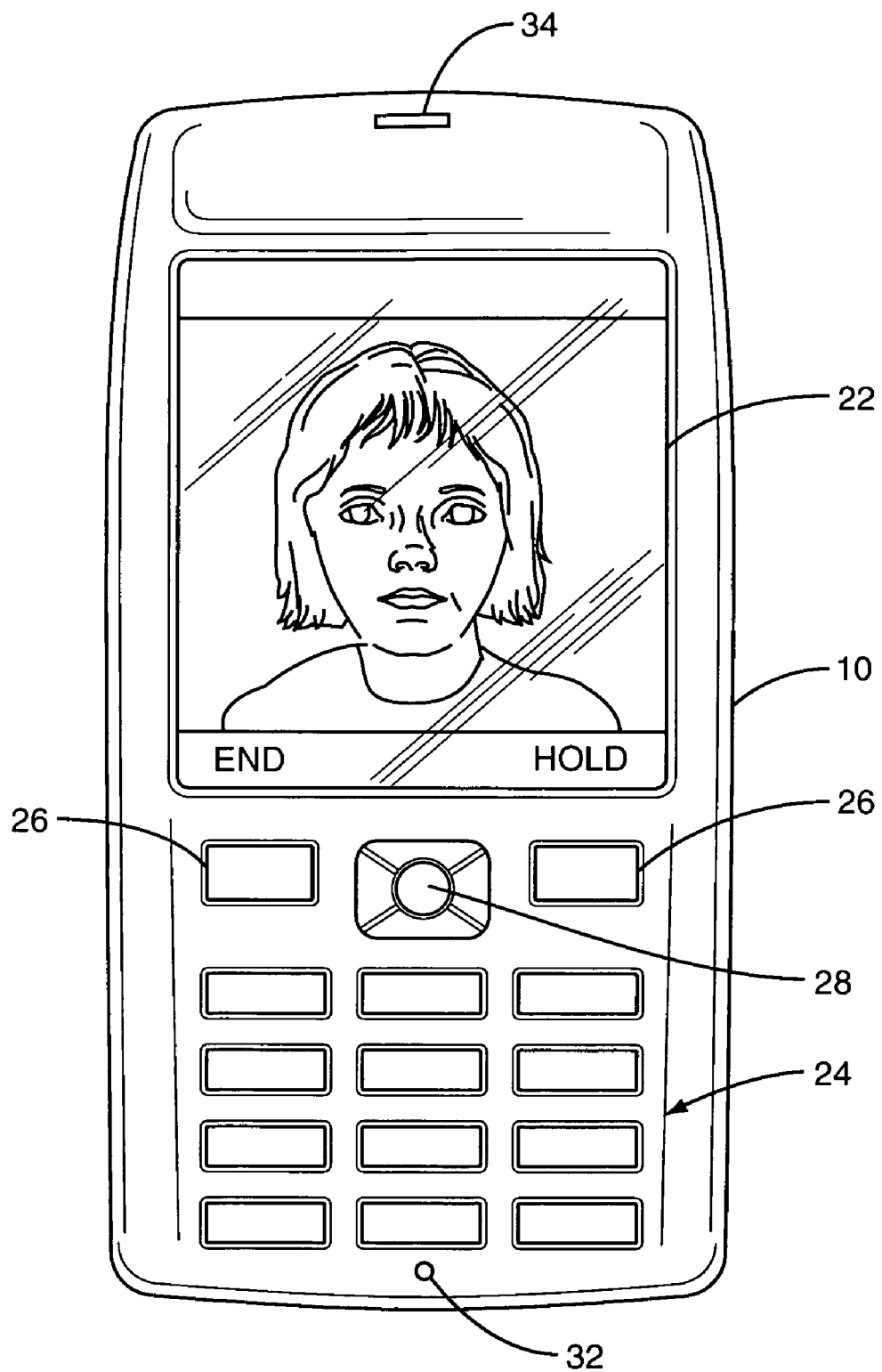
FIG. 2 illustrates an exemplary mobile communication device.

FIGS. 1 and 2 illustrate an exemplary mobile communication device 10. The main components of mobile communication device 10 comprise a system controller 12 to control overall operation of the mobile communication device 10, memory 14 to store program instructions and data needed for operation, a communication circuit 16 coupled to an antenna 18 for transmitting and receiving signals, and a user interface 20 to enable the user to interact with the mobile communication device 10. Mobile communication device 10 further includes a camera module 40 for capturing both still images and video images.

System controller 12 may comprise one or more processors, hardware, firmware, or any combination thereof. The system controller 12 controls the overall operation of mobile communication device 10 according to programs stored in memory 14. Memory 14 includes both read-only memory (ROM) and random access memory (RAM). Programs needed for operation are stored in permanent memory, such as an erasable programmable read-only memory (EPROM), or flash memory. As described in more detail below, memory 14 stores a video communication application 52 for video communications with remote parties. Memory 14 may also store video files 54 for transmission to a remote party, an address book 56, and one or more video lists 58. The use of these items is described below.

Communication circuit 16 may comprise, for example, a fully functional cellular transceiver, such as a Wideband CDMA (WCDMA) transceiver, capable of packet data communications. Alternatively, communication circuit 16 may comprise an Orthogonal Frequency Division Multiplexing (OFDM) transceiver, such as a WiMAX transceiver according to the Institute of Electrical and Electronics Engineers (IEEE) 802.11.x family of standards.

User interface 20 enables a user to interact with the mobile communication device 10. The user interface 20 comprises a display 22, one or more input devices indicated generally by the numeral 30, a microphone 32, and a speaker 34. Display 22 may comprise, for example, a liquid crystal display. The display 22 is used to output information for viewing by the user and to display video images during a video call. Display 22 may be a touchscreen display that also functions as an input device. Input devices 30 enable the user to enter data and commands and to control operation of the device 10. In the illustrated embodiment, the input devices 30 include a numeric keypad 24, a pair of soft keys 26 adjacent to display 22, and a joystick control 28. Other applicable types of input devices 30 include touch pads, scrolling devices, and pointing devices.

Camera module 40 includes optical assembly 42, image sensor 44, and image processor 46. Optical assembly 42 comprises one or more lenses and/or mirrors that collect and focus light onto image sensor 44. Image sensor 44 captures images formed by the focused light. Image sensor 44 may be any conventional image sensor, such as a charge-coupled device (CCD) or a complementary metal oxide semiconductor (CMOS) image sensor. Image processor 46 processes raw image data captured by image sensor 44 for subsequent storage in memory 14, output to display 22, and/or for transmission by communication circuit 16. The image processor 46 may be a conventional digital signal processor programmed to process image data, which is well known in the art.

A video communication application 52 is stored in the memory 14 of mobile communication device 10 and executed by system controller 12 to enable video conferencing with the remote parties. The video communication application 52 may comply with the H.323 standard or other video conferencing standard. The H.323 standard defines protocols to provide audio-visual communication sessions on a packet data network. The H.323 standard is commonly used in voice-over IP (VoIP) and IP-based video conferencing systems.

The video communication application 52 enables the user to establish, maintain, and terminate video calls with one or more remote parties. A video call is a call in which a video images are transmitted along with voice. The video communication application 52 preferably includes a call hold feature that allows the user to place a video call with a remote party on hold. The call may be placed on hold, for example, by pressing a designated soft key 26. While the call is on hold, the user may initiate a new call, accept an incoming call, or transfer the original call to another party. After a call is placed on hold, the user may remove the original call from hold and continue with the call. Incoming calls may be place on hold prior to answering to allow the user to complete an on going call.

According to the present invention, the user may select a pre-recorded video to transmit to the holding party when a video call is placed on hold. The pre-recorded video may be stored in the memory 14 of the mobile communication device 10 or, as described below, may be stored on a remote video server.

In one exemplary embodiment, mobile communication device 10 stores one or more video files 54 in memory 14. Memory 14 also stores a video list 58 that indicates which ones of the video files 54 are designated for transmission when a call is placed on hold. When the user places a call on hold, the video list 58 containing the designated video files 54 is presented to the user on the display 22 and the user selects a video from the video list 58 to transmit to the remote party.

Figure 3A:
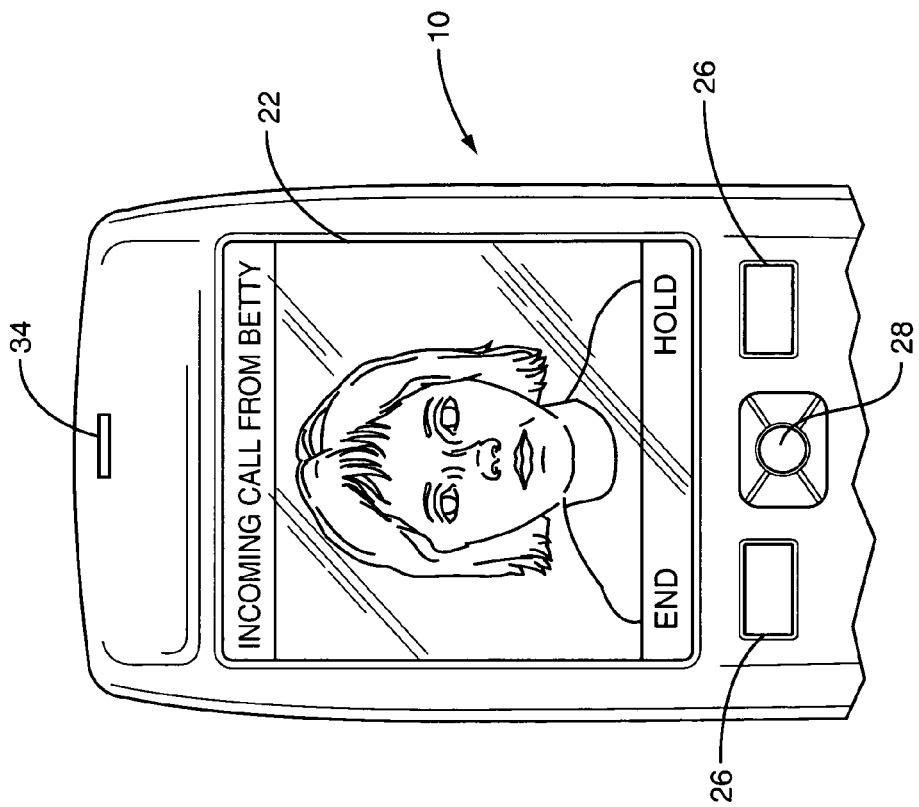
FIGS. 3A-3D illustrate an exemplary video telephony application and method for placing a video call on hold.
Figure 3B:
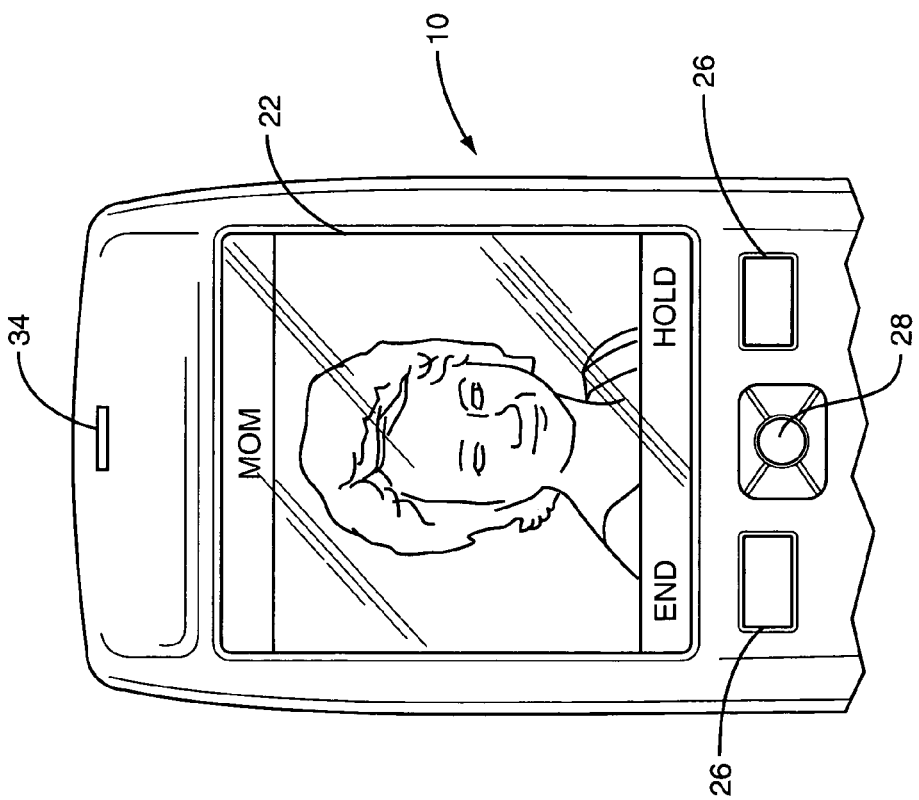
Figure 3D:
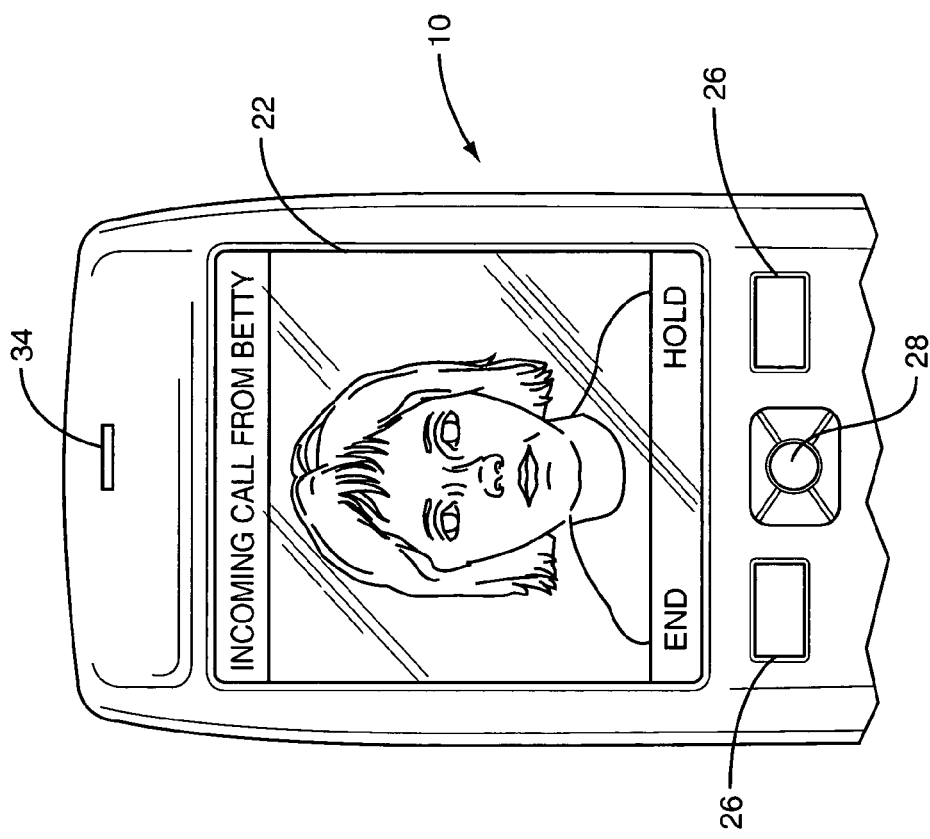

FIGS. 3A-3D illustrate an exemplary video communication application 52 according to one embodiment. In FIG. 3A, a user named Alice is engaged in a video call with her mother. A video of Alice's mother is output to the display 22. A menu bar appears across the bottom of the display 22 providing one or more menu options. In this example, the menu options include HOLD and END. The HOLD menu option is used to place the active call on hold. The END menu option is used to end the active call. These menu options are selected by pressing a corresponding soft key 26 adjacent the display 22. A message bar appears across the top of the display. In FIG. 3A, the message bar identifies the remote party.

Figure 3C:
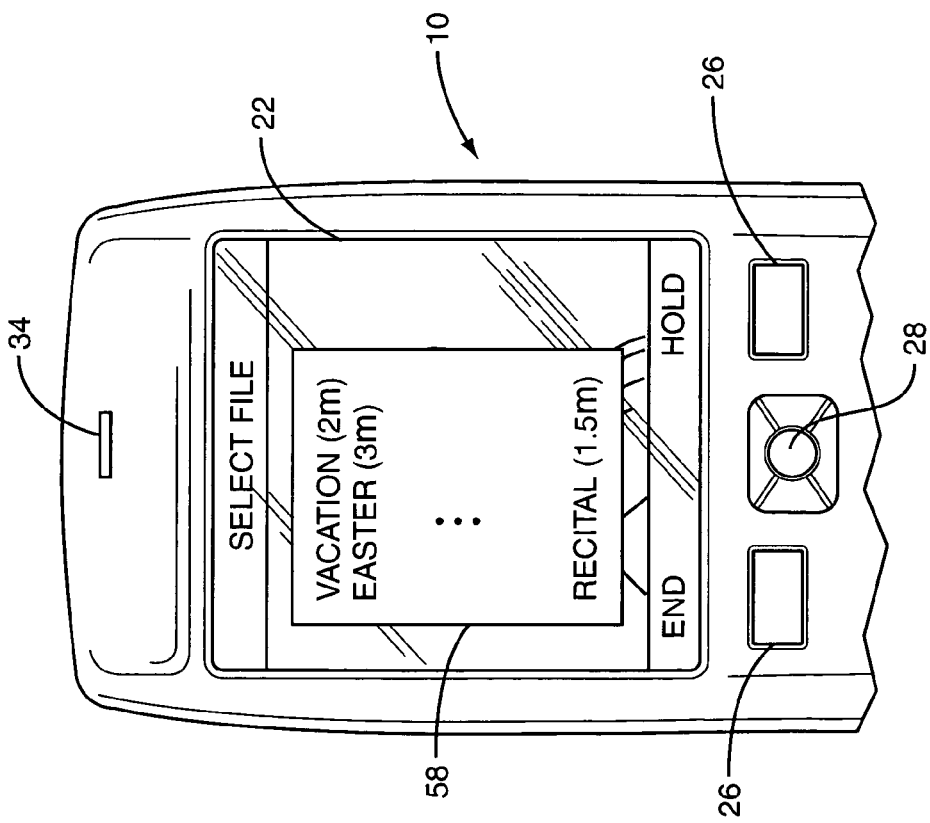

In FIG. 2B, a message appears in the message bar indicating that Alice's best friend Betty is calling. Because Alice wants to speak with her friend, she places the on-going call with her mother on hold by pressing the soft key 26 indicated by the HOLD menu option. When the HOLD option is selected, a list 58 of pre-recorded video files appears on the display 22 as shown in FIG. 3C. Alice uses the joystick control 28 to select a video from the video list 58, which has previously been stored in memory 14. The selected video is transmitted to the Alice's mother while the call is on hold. Alice may then answer the incoming video call from Betty while her mother watches the selected video. When Alice ends her call with Betty, Alice may take the original call with her mother off hold and continue with the video call.

In other embodiments, mobile communication device 10 may be configured to automatically select a video from the video list 58 responsive to the activation of the HOLD key. Mobile communication device 10 may be programmed to select the video files in the video list 58 in sequence each time a call is put on hold. Alternatively, mobile communication device 10 may be programmed to randomly select a video file from the video list 58 each time a call is place on hold.

In another embodiment, mobile communication device 10 may store an address book 56 in memory 14. A video file 54 stored in memory 14 may be associated with each person entered in the address book 56. Mobile communication device 10 may be programmed to look up the video file to transmit to the remote person identified in the address book 56 when a call is placed on hold. A default video file may be specified in case the person placed on hold is not listed in the address book 56, or in case the person's address book entry does not have an associated video file.

Instead of specifying a particular video file to transmit, address book 56 may indicate a video list 58 from which a video file is to be selected. Multiple video lists 58 may be stored in memory 14. Mobile communication device 10 may be programmed either sequentially or randomly to select a video file from the specified video list 58 when a call is place on hold. For example, mobile communication device 10 may store a first video list 58 for the user's family members, and a second video list 58 for a selected group of friends. The address book 56 indicates which video list 58 to use when a call with a person in the address book 56 is placed on hold. As noted above, the video file may be selected from the video list 58 sequentially or randomly.

Instead of transmitting video file to a holding party directly from mobile communication device 10, video files may be stored in a network server. Service providers may offer an enhanced call service on a subscription basis to its customers. Users subscribing to the service may be allowed to store video files on the network server. When a call is placed on hold, mobile communication device 10 may signal the network server to play back a specified video file to the holding party.

Figure 4:
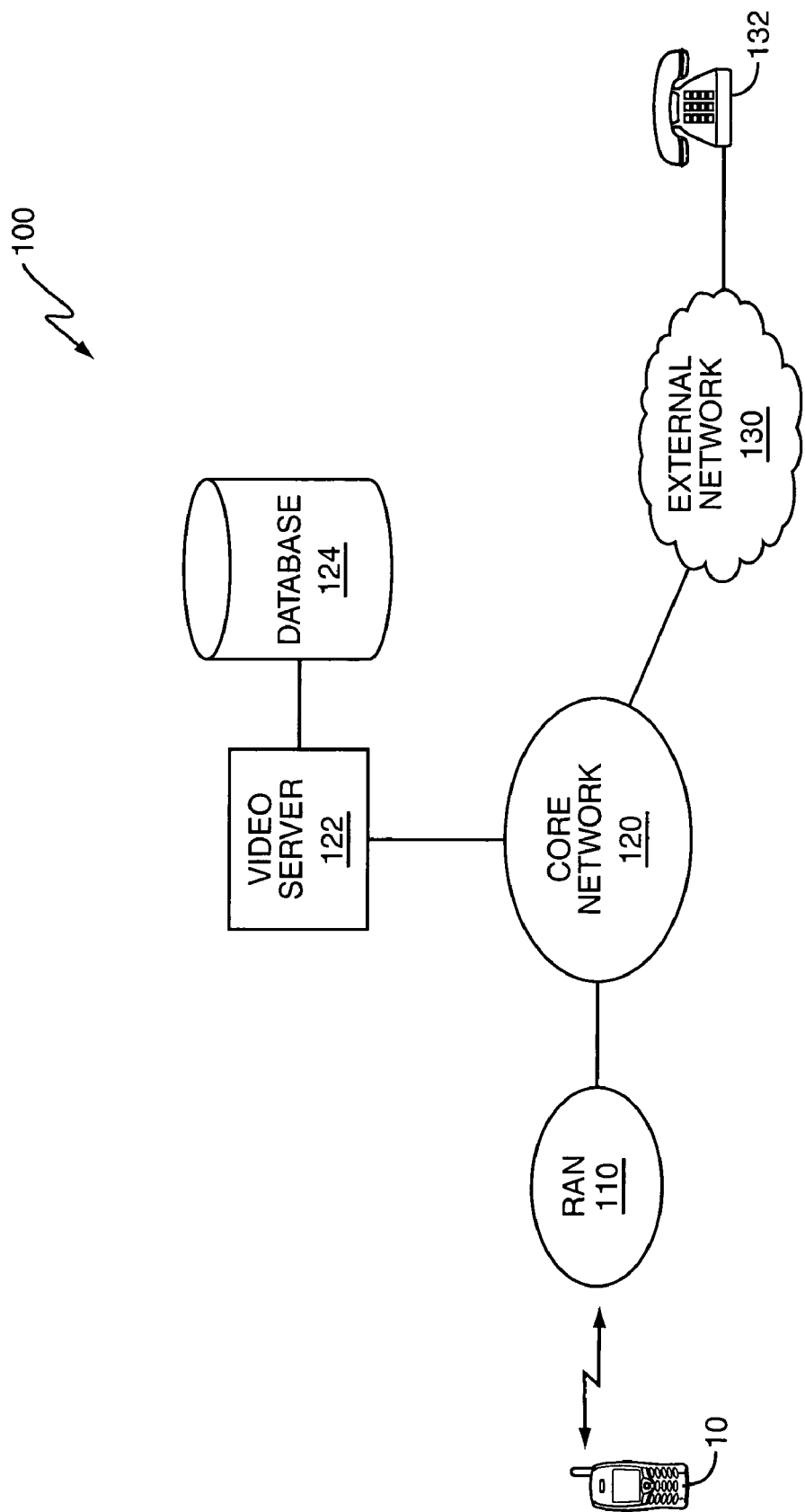
FIG. 4 illustrates an exemplary mobile communication network having a video server located within the network.

FIG. 4 illustrates a communication network 100 implementing a network-based video service. Network 100 includes one or more radio access networks 110 for communicating with mobile communication devices 10, and a core network 120 providing connection to external networks 130, such as the Public Switched Telephone Network (PSTN) and/or Internet. A video server 122 connected to the core network 120 has access to a database 124 for storing video files for registered users. When a video call with a registered user is placed on hold, the mobile communication device 10 for the registered user sends a signaling message to the video server 122 requesting that a video file stored in database 124 be transmitted to the holding party. The video server 122 retrieves the specified video file from database 124 and transmits the video file to the holding party.

The video server 122 may also be used to implement a call-waiting service in which a video file is transmitted to the holding party while the holding party waits for a call to a registered user to be completed. For example, assume that a calling party A initiates a video call to a called party B. The called party B is already engaged in another call. If the called party B has subscribed to the video service, the video server 122 may offer to play a video file for the calling party A. The video file may be selected according to any of the methods previously described. When the called party B becomes available, the call to party B is completed.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of holding a video call implemented in a mobile terminal, said method comprising:
   storing one or more pre-recorded videos in a remote video server;
   placing a video call with a remote party on hold; and
   sending a signaling message to the remote video server to initiate transmission of a pre-recorded video selected by the mobile terminal to the remote party while the video call with the remote party is on hold.

2. The method of claim 1 further comprising selecting the pre-recorded video to be transmitted.

3. The method of claim 2 wherein selecting the pre-recorded video comprises prompting a user to select one of a group of pre-recorded videos stored in memory, and receiving a user input indicative of the user's selection.

4. The method of claim 2 wherein selecting the pre-recorded video comprises sequentially selecting said pre-recorded video from a group of pre-recorded videos.

5. The method of claim 2 wherein selecting the pre-recorded video comprises randomly selecting said pre-recorded video from a group of pre-recorded videos.

6. The method of claim 2 wherein selecting the pre-recorded video comprises selecting the pre-recorded video based on the identity of the remote party.

7. A mobile communication device comprising:
   a communication circuit for transmitting and receiving video during a video call; and
   a control unit operatively connected to the communication circuit, said control unit operative to send a signaling message to a remote video server responsive to a video call being placed on hold to initiate transmission of a video selected by the mobile communication device to a remote party while the video call with the remote party is on hold.

8. The mobile communication device of claim 7 wherein the control unit selects a pre-recorded video to transmit to the remote party responsive to user input.

9. The mobile communication device of claim 8 wherein the control unit selects the pre-recorded video to transmit from a defined group of videos.

10. The mobile communication device of claim 9 wherein the control unit sequentially selects the pre-recorded video to transmit from said defined group of videos.

11. The mobile communication device of claim 9 wherein the control unit randomly selects the pre-recorded video to transmit from said defined group of videos.

12. The mobile communication device of claim 8 wherein the control unit selects the pre-recorded video to transmit based on the identity of the remote party.

* * * * *